United States Patent
Hachtel

(10) Patent No.: US 6,299,260 B1
(45) Date of Patent: Oct. 9, 2001

(54) METHOD AND DEVICE FOR CONTROLLING A PUMP IN A BRAKE SYSTEM

(75) Inventor: Juergen Hachtel, Moeckmuehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/539,648

(22) Filed: Mar. 30, 2000

(30) Foreign Application Priority Data

Mar. 30, 1999 (DE) ............................................... 199 14 404

(51) Int. Cl.$^7$ ................ B60T 8/32; B60T 8/40; B60T 13/18; F04B 49/00
(52) U.S. Cl. .................. 303/10; 303/115.4; 303/116.1
(58) Field of Search ............................ 303/115.4, 116.1, 303/116.4, 10–12, 156, 162, DIG. 3, DIG. 4, 157, 158, 122.12, 115.2; 701/70, 78; 73/121; 307/10.1; 318/139, 432; 188/162; 323/210, 211; 388/800, 809; 417/1, 44.1, 45, 53, 38, 42

(56) References Cited

U.S. PATENT DOCUMENTS

| | | | |
|---|---|---|---|
| 5,188,440 | * | 2/1993 | Muller et al. ........................... 303/10 |
| 5,454,632 | * | 10/1995 | Burgdorf et al. .................. 303/115.4 |
| 5,487,593 | * | 1/1996 | Potts et al. ............................. 303/11 |
| 5,492,008 | * | 2/1996 | Schnerer et al. . |
| 5,494,343 | * | 2/1996 | Lindenman et al. . |
| 5,547,265 | * | 8/1996 | Harris et al. ........................... 303/10 |
| 5,558,414 | * | 9/1996 | Kubofa ................................... 303/10 |
| 5,704,766 | * | 1/1998 | Fennel et al. ........................... 417/42 |
| 5,791,765 | * | 8/1998 | Sakakibana ........................ 303/116.1 |
| 6,095,620 | * | 8/2000 | Dillard et al. ..................... 303/116.1 |
| 6,158,825 | * | 12/2000 | Schunck et al. .................. 303/115.4 |

FOREIGN PATENT DOCUMENTS

| | | |
|---|---|---|
| 44 08 879 | 9/1995 | (DE) . |
| 44 40 517 | 5/1996 | (DE) . |
| 196 51 154 | 6/1997 | (DE) . |
| 196 22 754 | 12/1997 | (DE) . |
| 19818174 * | 11/1999 | (DE) . |
| 1040975 * | 10/2000 | (EP) . |
| 19914404 * | 10/2000 | (DE) . |
| 1170866 * | 3/1999 | (JP) . |
| WO94/07717 | 4/1994 | (WO) . |

* cited by examiner

*Primary Examiner*—Douglas C. Butler
(74) *Attorney, Agent, or Firm*—Kenyon & Kenyon

(57) ABSTRACT

A method of controlling a pump in a brake system of a motor vehicle, in particular an electrohydraulic brake system, is described, where the pump can be controlled by a pump motor either uncycled or continuously and cycled, where the period of uncycled control and/or an initial pulse-pulse pause ratio at the start of cycled control can be varied as a function of a voltage applied to the pump motor before and/or at the start of and/or during uncycled control and/or as a function of an on-board voltage of the motor vehicle determined before and/or at the start of and/or during uncycled control.

6 Claims, 2 Drawing Sheets

METHOD AND DEVICE FOR CONTROLLING A PUMP IN A BRAKE SYSTEM

BACKGROUND INFORMATION

A method and a device for controlling a recirculating pump in a brake system are known from International Patent Publication No. WO 94/07717, which describes a method and a device for regulating the flow rate of a hydraulic pump which is driven by an electric motor with a variable pulse-pulse pause sequence. Such hydraulic pumps, which are also known as recirculating pumps, are used to produce an auxiliary pressure in a brake system having traction control and/or an anti-skid system.

During the pulse pauses, the generator voltage generated by the pump motor is analyzed as a measure of the pump speed; a pump speed setpoint is compared with an actual value of the pump speed in a control circuit, and a new manipulated variable for the pump control is derived from the difference. One disadvantage of this known arrangement is that it requires a very demanding controller which generates a pulse width-modulated signal on the basis of the difference between this setpoint and the actual value.

German Patent No. 44 40 517 describes a method of controlling a recirculating pump in a brake system, where the recirculating pump can be controlled by demand as a function of the value of a manipulated variable and/or a control deviation of a controller which influences the braking torque and/or the wheel rpm. This method also involves a relatively complicated control.

With electrohydraulic brake systems in particular, a hydraulic accumulator is usually charged by an electric motor and a high-pressure pump driven by the latter. At the start of control, the pump motor is controlled fully for a fixed period of time, i.e., continuously or uncycled. The electric motor driving the pump is connected to the on-board voltage of the motor vehicle. On reaching the desired pressure in the hydraulic accumulator, the pump can either be shut down or driven in cycled operation to maintain the pressure in the hydraulic accumulator. A pulse-pulse pause ratio of the pump drive is varied here as a function of a pump voltage applied to the pump. An initial pulse-pulse pause ratio at the start of cycled operation (i.e., after the end of continuous pump control) is preselected here as a constant. The duration of continuous pump control is also constant with traditional systems. However, since the on-board voltage in a motor vehicle can fluctuate greatly, these constant settings for various on-board voltages lead to different rotational speeds of the pump. For example, at a low on-board voltage, a pump can be brought to a certain set speed only by varying the pulse pause ratio accordingly during cycled operation. Consequently, a relatively long period of time is needed to establish a set speed because the pulse-pulse pause ratio is adjusted or regulated only after the start of cycled control.

SUMMARY OF THE INVENTION

Therefore, an object of the present invention is to provide a pump of a brake system of a motor vehicle such that a speed setting can be achieved in the shortest possible period of time. The pump mentioned here may also correspond to any means conveying a pressure medium in a brake system, in particular a storage pump of an electrohydraulic brake system, a recirculating pump, a supercharge pump, a booster pump, etc.

Due to the possibility of varying the duration of full or continuous control at the start of and/or during the start-up of pump control as well as varying the initial pulse pause ratio in the transition to cycled operation of the pump, the period of time in which a speed setting can be achieved is greatly shortened in comparison with traditional pumps or pump controls. The method and the device according to the present invention are also advantageous in that this accelerated pump speed setting can be implemented very easily, namely by monitoring a voltage applied to the pump and/or the on-board voltage of the motor vehicle.

According to an advantageous embodiment of the method according to the present invention, following the initial pulse-pulse pause ratio, the additional pulse-pulse pause ratio is varied during cycled control as a function of the voltage of the pump motor. Such a use of the voltage of the pump has proven to be very reliable because the pump voltage is proportional in first approximation to the pump speed or the pump motor speed.

DETAILED DESCRIPTION

Figure 1:
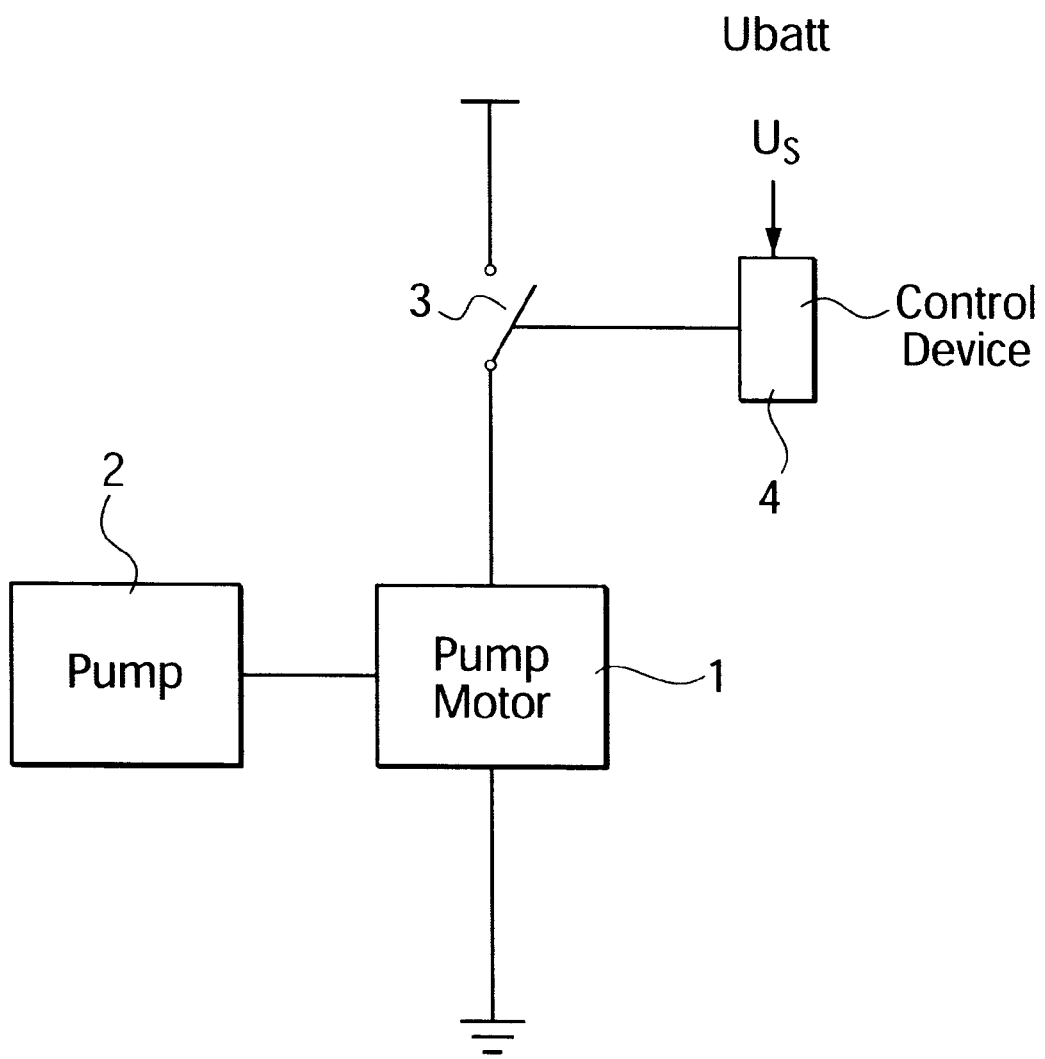
FIG. 1 shows the elements for controlling a recirculating pump.

FIG. 1 shows the important elements for the method according to the present invention for controlling a pump motor 1 for acting on a recirculating pump 2. To simplify the illustration, the brake system that can be acted upon by recirculating pump 2 is not shown.

Pump motor 1 is connected to on-board voltage Ubatt of the motor vehicle by way of switching means 3 that can be operated. Switching means 3 can be operated by a control device 4. Switching means 3 is implemented as a field effect transistor, for example. On closing the switching means, pump motor 1 receives current.

Figure 2:
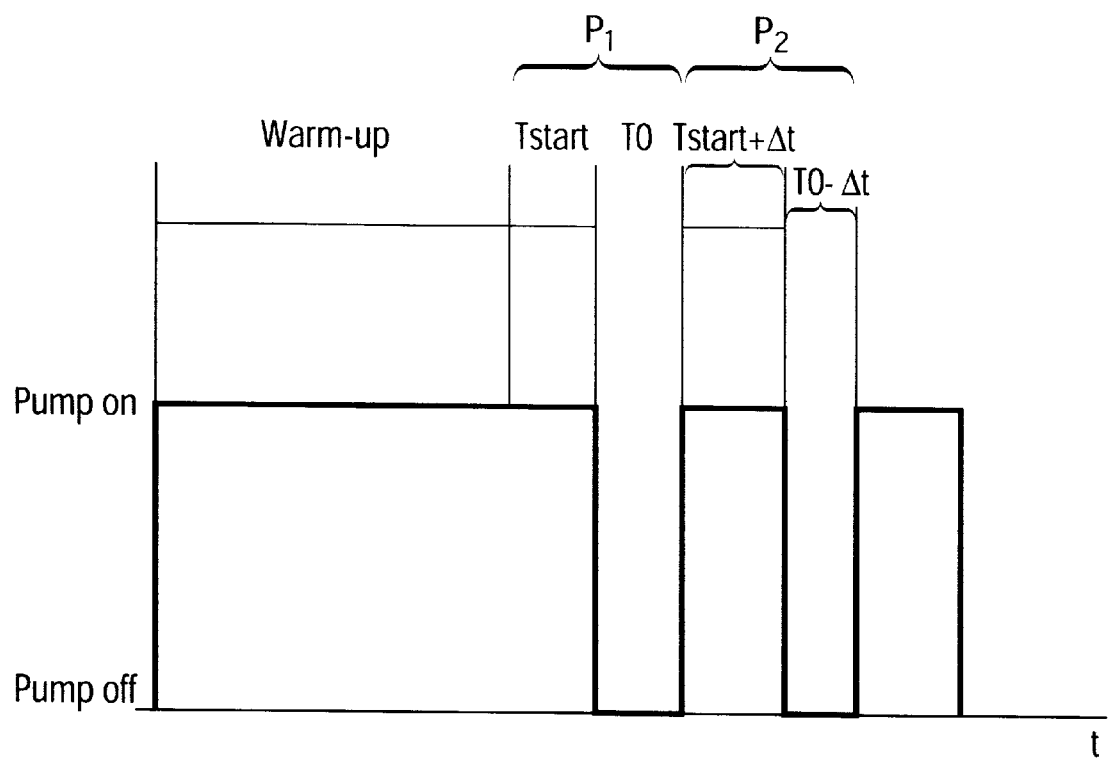
FIG. 2 shows a schematic time diagram of a typical pump motor control for a recirculating pump.

A typical control of pump motor 1 of recirculating pump 2 is illustrated in FIG. 2. During a first phase Tanlauf, switching means 3 are closed, so that pump motor 1 is driven continuously. Cycled operation of the pump control follows Tanlauf, where periods $P_i$ (i=1, 2, ...) include control times (pulse times) Tstart and non-control times (pulse pauses) T0. Ratio Tstart:T0 during first period $P_1$ is the starting pulse-pulse pause ratio. It can be seen that an altered pulse-pulse pause ratio is obtained for second period $P_2$ (for example), with period Tstart being increased by $\Delta t$ and period T0 being reduced by $\Delta t$. Pump motor 1 is driven proportionally longer during period $P_2$ in comparison with period $P_1$ according to this altered pulse-pulse pause ratio.

Figure 3:
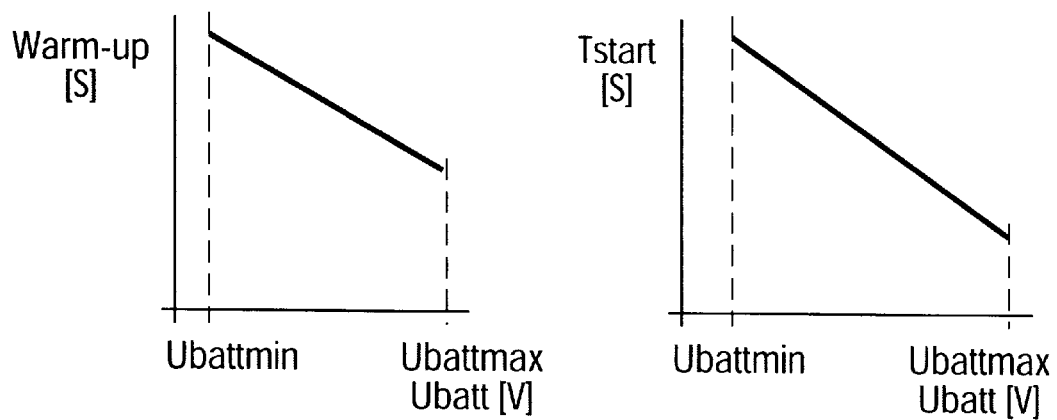
FIG. 3 shows diagrams illustrating the method of varying the pump control according to the present invention.

FIG. 3 shows how period Twarmup and period Tstart of first period $P_1$ of cycled operation of the pump can be varied as a function of a variable on-board voltage. Let it be assumed by way of an explanation that on-board voltage Ubatt can fluctuate between a minimum value Ubattmin and a maximum value Ubattmax. It can be seen that for lower on-board voltages, period Twarmup of the initial continuous pump control as well as period Tstart of first period $P_1$ of cycled operation are increased accordingly at a lower on-board voltage (Ubattmin).

Periods Twarmup and Tstart are adjusted by control device 4 which receives as its input signal a signal $U_s$ representing the voltage applied to pump motor 1 and/or on-board voltage Ubatt. These voltages are preferably determined at the start of the control of the pump motor. However, it is also possible to determine them before, in particular immediately before, or during the control.

The changes in pulse pause ratio resulting in additional periods $P_2 \ldots P_n$ are shown as Tstart+$\Delta$t or T0−$\Delta$t for period $P_2$ in FIG. 2 and can be determined, for example, as a function of the voltage of the pump motor of the recirculating pump. A voltage occurs at pump motor 1 due to the fact that when the pump motor is turned off, first the voltage applied to the motor increases because of the inductance of the motor and then it drops exponentially. As mentioned previously, the speed of the pump motor is proportional to this voltage in first approximation.

If, for example, there is a change from brief full control (approximately 50 to 200 msec) to cycled operation, the initial pulse-pulse pause ratio characterized by control time Tstart and non-control time T0 is adjusted as a function of the on-board voltage. This initial pulse-pulse pause ratio can be determined during full control, so that a desired speed of pump motor 1 or recirculating pump 2 can be achieved more rapidly on the whole. The desired pump delivery rate is thus achieved more rapidly after it is activated.

Thus, fluctuations in on-board voltage affecting the pump control can be compensated easily.

It should be pointed out that the on-board voltage can be picked up at any suitable location in the vehicle electrical system. It has proven especially advantageous to use the dropping voltage on the pump motor for this purpose.

What is claimed is:

1. A method of controlling a pump in an electrohydraulic brake system of a motor vehicle, comprising the steps of:

controlling the pump by a pump motor during both unclocked continuous operation and clocked cycled operation;

varying a period of control of the unclocked cycle as a function of a voltage applied to the pump motor; and varying an initial pulse-pulse pause ratio at a start of control of the clocked cycle as a function of the voltage applied to the pump motor.

2. The method according to claim 1, further comprising the step of, following the initial pulse-pulse pause ratio, varying an additional pulse-pulse pause ratio during a control of the clocked cycle as a function of the voltage applied to the pump motor.

3. The method of claim 1, wherein the period of control of the unclocked cycle and the initial pulse-pulse pause ratio at the start of control of the clocked cycle are varied as a function of an on-board voltage of the motor vehicle determined at least one of: (a) before, (b) at the start of, and (c) during the control with the unclocked cycle.

4. A device for controlling a pump in an electrohydraulic brake system of a motor vehicle, comprising:

a pump motor for controlling the pump in a continuous unclocked cycle and in a clocked cycle; and means for varying a period of control of the unclocked cycle as a function of a voltage applied to the pump motor; and means for varying an initial pulse-pulse pause ratio at a start of control of the clocked cycle as a function of the voltage applied to the pump motor.

5. The device according to claim 4, further comprising means for varying, following the initial pulse-pulse pause ratio, an additional pulse-pulse pause ratio during a control of the clocked cycle as a function of the voltage applied to the pump motor.

6. The device of claim 4, wherein the period of control of the unclocked cycle and the initial pulse-pulse pause ratio at the start of control of the clocked cycle are varied by the respective means for varying, as a function of an on-board voltage of the motor vehicle determined at least one of: (a) before, (b) at the start of, and (c) during the control with the unclocked cycle.

* * * * *